United States Patent
Lau et al.

(10) Patent No.: US 11,810,118 B2
(45) Date of Patent: *Nov. 7, 2023

(54) SANDBOX BASED TESTING AND UPDATING OF MONEY LAUNDERING DETECTION PLATFORM

(71) Applicant: GUARDIAN ANALYTICS, INC., Mountain View, CA (US)

(72) Inventors: Matthew Lau, San Francisco, CA (US); Sarah Ying Xu, Sunnyvale, CA (US); Rafael Seraphin Seste, Sao Paulo (BR); Felipe Miney Gonçalves Da Costa, Sao Paulo (BR); Jessé de Moura Tavano Moretto, Sao Paulo (BR)

(73) Assignee: GUARDIAN ANALYTICS, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/868,828

(22) Filed: Jul. 20, 2022

(65) Prior Publication Data

US 2022/0358511 A1  Nov. 10, 2022

Related U.S. Application Data

(63) Continuation of application No. 16/851,573, filed on Apr. 17, 2020, now Pat. No. 11,436,605.

(51) Int. Cl.
*G06Q 20/40* (2012.01)
*G06F 11/36* (2006.01)
*G06F 21/53* (2013.01)

(52) U.S. Cl.
CPC ..... *G06Q 20/4016* (2013.01); *G06F 11/3664* (2013.01); *G06F 21/53* (2013.01)

(58) Field of Classification Search
CPC .............. G06Q 20/4016; G06Q 20/405; G06F 11/3664; G06F 21/53
See application file for complete search history.

(56) References Cited

U.S. PATENT DOCUMENTS 10,607,228 B1 * 3/2020 Gai ..................... G06N 5/046
2015/0088733 A1 * 3/2015 Monastyrsky ....... G06Q 20/382
705/39

(Continued)

OTHER PUBLICATIONS

Daniel Mikkelsen et al, Flushing out the money launderers with better customer risk-rating models, McKinsey & Company (Year: 2019).*

*Primary Examiner* — Shanto Abedin
(74) *Attorney, Agent, or Firm* — SOROKER AGMON NORDMAN RIBA; LIAT Lin; Sharone Goddesh

(57) ABSTRACT

A computerized-method for initiating a sandbox-testing-process-flow associated with a client-entity, within a server runtime environment and configuring said sandbox testing process flow with money laundering-detection-rules is provided herein. The computerized-method includes receiving: an instruction for initiating a sandbox-testing-process-flow associated with a client-entity; one or more money-laundering-detection-rules for implementation within the sandbox-testing-process-flow; parameters defining historical-transaction-data to be retrieved by the sandbox-testing-process-flow; monitoring the one or more money-laundering-detection-rules by implementing through the sandbox-testing-process-flow, money-laundering event analysis based on an application of the one or more rules on retrieved historical-transaction-data by the received parameters thereof for generating a money-laundering event determination decision indicative of whether the retrieved historical-transaction-data is an outcome of money-laundering related activity; and transmitting results of the money- (Continued)

laundering event analysis implemented through the sandbox-testing-process-flow to the client-entity to check that the one or more money-laundering-detection rules are error free and do not result in any unintended outcomes or errors.

11 Claims, 10 Drawing Sheets

(56) References Cited

U.S. PATENT DOCUMENTS

| | | | |
|---|---|---|---|
| 2015/0279155 A1* | 10/2015 | Chun | G06Q 20/4016 463/25 |
| 2016/0379309 A1* | 12/2016 | Shikhare | G06Q 40/08 705/4 |
| 2019/0220863 A1* | 7/2019 | Novick | G06Q 20/10 |
| 2019/0325528 A1* | 10/2019 | Adjaoute | G06N 3/006 |

* cited by examiner

SANDBOX BASED TESTING AND UPDATING OF MONEY LAUNDERING DETECTION PLATFORM

RELATED APPLICATIONS

This application claims priority as a continuation from application Ser. No. 16/851,573 dated Apr. 17, 2020, the disclosure of which is incorporated herein by reference.

BACKGROUND OF THE INVENTION

Field of the Invention

The invention relates to the domain of detection and prevention of money laundering activities in connection with electronic transactions. In particular, the invention provides methods, systems and computer program products for sandbox enabled testing and updating of rule configurations for money laundering detection platforms.

Description of Related Art

The increasing availability and popularity of digital banking services, electronic payment transactions, and automated clearing house (ACH) transactions has resulted in corresponding increases in instances of money laundering activities being carried out through such services and transactions.

The term "money laundering" can be understood as referring to an illegal process of concealing the origin of money obtained illegally, by passing it through a series of banking transfers or commercial transactions. The overall scheme of such processes is to return the money to the launderer in an obscure or indirect way. Money laundering more often than not takes finds that originate from an illicit or illegal activity and manipulate such funds through the financial system so as to make the funds appear to be from a different and legitimate source. Money laundering typically involves multiple different steps, including (i) placement, where the illegal funds are first introduced into a financial system, (ii) layering, where the illicit finds are combined or routed through multiple transactions with legitimate sources/entities, and (iii) integration, where the illicit funds are returned to the launderer through seemingly legitimate transactions.

It has been found that money laundering occurs through a wide variety of financial products and access channels, including current accounts (EFT/ACH/SWIFT, wire, check, cash), loans, investment products, credit cards (purchases, returns, over payments) and debit cards (traditional and pre-paid). A recent proliferation of technologies, from mobile payments to cryptocurrencies, has increased the difficulty of finding a comprehensive solution.

While instances of money laundering are observed in several different forms, each instance has a common underlying theme—i.e., a money launderer intentionally carries out financial transactions using one or more payment accounts or channels that correspond to legitimate individual or entities, in order to conceal the illegal origin of such funds, and to eventually return the funds to the launderer in a manner that makes the funds appear to have originated from a legitimate source.

In particular, money launderers have been found to initiate digital payment related money laundering activities for one or more of the placement, layering and/or integrations steps in the money laundering process.

Banks, financial institutions and digital banking platforms require to monitor electronic transactions (e.g., electronic payment transactions and/or electronic fund transfers) to ascertain whether a transaction comprises legitimate financial activity or money laundering related activity, so that money laundering related financial transactions can be detected, prevented or remedied.

The existing state of art provides for cloud-based solutions where transaction data corresponding to either a requested electronic transaction or to an electronic transaction that is under implementation is forwarded to a money laundering detection platform. The money laundering detection platform assesses the transaction data based on one or more money laundering detection rules or money laundering detection rulesets. While some money laundering detection rules or rulesets may be generally applicable to all entities utilizing the services of a money laundering detection platform, other rules or rulesets may be entity specific. Accordingly, each client entity that uses the services of a money laundering detection platform for monitoring electronic transactions associated with such client entity, may have one or more corresponding rulesets that are associated with such entity—said rulesets containing rules that have been customized for money laundering detection on behalf of such entity.

It has been found that updating or modifying entity specific money laundering detection rules or rulesets is complicated and requires participation of system administrators or devops at the money laundering detection platform. Further, once the rules or rulesets have been modified at the money laundering detection platform, implementation of the modified rules requires to be carefully monitored to ensure that the modifications are error free and do not result in any unintended outcomes or errors. The overall process has been found to be time consuming, expensive and inconvenient.

There is accordingly a need for a solution that enables client entities to conveniently modify money laundering detection rules or rulesets (without the active participation of system administrators or DevOps at the money laundering detection platform), and which enables safe and convenient testing of the modified money laundering detection rules or rulesets to ensure that such modifications do not result in unintended outcomes or errors.

SUMMARY OF THE INVENTION

The invention provides methods, systems and computer program products for sandbox enabled testing of money laundering detection rules or rulesets, and for updating or modifying existing money laundering detection rules or rulesets based on the results of the sandbox enabled testing.

In an embodiment, the invention provides a method for updating configuration of a money laundering detection platform. The method comprises implementing at a processor implemented money laundering detection server, the steps of (i) receiving a request for a modification of a first ruleset for electronic transaction related money laundering event detection, (ii) identifying a client entity with which the received rule modification request is associated, (iii) initiating a sandbox testing process flow for testing the requested modification of the ruleset, (iv) associating the sandbox testing process flow with the identified client entity, (v) generating a modified second ruleset for electronic transaction related money laundering event detection, based on modification information received within or along with the received request for modification of the first ruleset, (vi)

retrieving historical transaction data associated with the identified client entity, (vii) implementing through the sandbox testing process flow, money laundering event analysis based on application of the modified second ruleset to the retrieved historical transaction data for generating a money laundering event determination decision indicative of whether the historical transaction data is an outcome of money laundering related activity, and (viii) transmitting results of the money laundering event analysis implemented through the sandbox testing process flow to the client entity.

In an embodiment, the method may further comprise (i) receiving an instruction to modify the configuration of the money laundering detection platform by updating the first ruleset for consistency with one or more rules within the modified second ruleset, or with the entire modified second ruleset, and (ii) modifying the configuration of the money laundering detection platform by updating the first ruleset in accordance with the received instruction.

In an embodiment of the method, subsequent to modification of the configuration of the money laundering detection platform, data associated with the sandbox testing process flow is purged from a memory of, or from a runtime environment of the money laundering detection server.

In a particular method embodiment, the received request for the modification of the first ruleset may comprise any of addition of a new rule to the first ruleset, deletion of a prior existing rule within the first rule set, and amendment of a prior existing rule within the first rule set.

In another method embodiment, the received request for the modification of the first ruleset may relates to a ruleset that is exclusively associated with the identified client entity for implementation of money laundering event detection.

The client entity with which the received rule modification request is associated, may be identified based on any one or more of a received client entity identifier, a network address of a client terminal from which the request for the modification of the first ruleset has been received, and a device identifier associated with a client device from which the request for the modification of the first ruleset has been received.

In a particular embodiment of the method, a runtime environment for implementing the sandbox testing process flow includes a physical or logical area of the money laundering detection server memory or runtime environment that is configured to implement money laundering event detection analysis of historical transaction data corresponding to the identified client entity, based on the modified second ruleset.

In another embodiment of the method, associating the sandbox testing process flow with the identified client entity includes any one or more of (i) retrieving path information for a data repository that stores historical transaction data associated with the identified client entity, (ii) establishing a physical or logical network data channel for retrieving historical transaction data of the identified client entity from a data repository that stores such historical transaction data, and (iii) establishing a physical or logical network channel for transmitting results of testing a rule modification(s) through the initiated sandbox testing process flow, to the client entity.

In a specific embodiment of the method, the retrieval of historical transaction data associated with the identified client entity is based on one or more historical transaction data filtering parameters that have been associated with the sandbox testing process flow.

In an embodiment of the method, the one or more historical transaction data filtering parameters are received through operator inputs from an operator or client device associated with the identified client entity.

In another embodiment of the method, one or both of the modified second ruleset and the retrieved historical transaction data are stored within a memory that is allocated to, accessible by, or controlled by the sandbox testing process flow.

The invention additionally provides a system for updating configuration of a money laundering detection platform, comprising a money laundering detection server that includes at least one memory, and a processor. The processor may be configured for (i) receiving a request for a modification of a first ruleset for electronic transaction related money laundering event detection, (ii) identifying a client entity with which the received rule modification request is associated, (iii) initiating a sandbox testing process flow for testing the requested modification of the ruleset, (iv) associating the sandbox testing process flow with the identified client entity, (v) generating a modified second ruleset for electronic transaction related money laundering event detection, based on modification information received within or along with the received request for modification of the first ruleset, (vi) retrieving historical transaction data associated with the identified client entity, (vii) implementing through the sandbox testing process flow, money laundering event analysis based on application of the modified second ruleset to the retrieved historical transaction data for generating a money laundering event determination decision indicative of whether the historical transaction data is an outcome of money laundering related activity, and (viii) transmitting results of the money laundering event analysis implemented through the sandbox testing process flow to the client entity.

In a system embodiment, the processor may be further configured for (i) receiving an instruction to modify the configuration of the money laundering detection platform by updating the first ruleset for consistency with one or more rules within the modified second ruleset, or with the entire modified second ruleset, and (ii) modifying the configuration of the money laundering detection platform by updating the first ruleset in accordance with the received instruction.

The system may be configured such that subsequent to modification of the configuration of the money laundering detection platform, data associated with the sandbox testing process flow is purged from a memory of, or from a runtime environment of the money laundering detection server.

In an embodiment, the system may be configured such that the received request for the modification of the first ruleset comprises any of (i) addition of a new rule to the first ruleset, (ii) deletion of a prior existing rule within the first rule set, and (iii) amendment of a prior existing rule within the first rule set.

In a system embodiment, the received request for the modification of the first ruleset relates to a ruleset that is exclusively associated with the identified client entity for implementation of money laundering event detection.

The system may be configured such that the client entity with which the received rule modification request is associated, is identified based on any one or more of a received client entity identifier, a network address of a client terminal from which the request for the modification of the first ruleset has been received, and a device identifier associated with a client device from which the request for the modification of the first ruleset has been received.

In a particular system embodiment, the processor is configured such that a runtime environment for implementing the sandbox testing process flow comprises a physical or logical area of the money laundering detection server memory or runtime environment that is configured to implement money laundering event detection analysis of historical transaction data corresponding to the identified client entity, based on the modified second ruleset.

In a further system embodiment, the processor is configured such that associating the sandbox testing process flow with the identified client entity includes any one or more of (i) retrieving path information for a data repository that stores historical transaction data associated with the identified client entity, (ii) establishing a physical or logical network data channel for retrieving historical transaction data of the identified client entity from a data repository that stores such historical transaction data, and (iii) establishing a physical or logical network channel for transmitting results of testing a rule modification(s) through the initiated sandbox testing process flow, to the client entity.

The system or the processor may be configured such that retrieval of historical transaction data associated with the identified client entity is based on one or more historical transaction data filtering parameters that have been associated with the sandbox testing process flow.

In a specific embodiment of the system the one or more historical transaction data filtering parameters are received through operator inputs from an operator or client device associated with the identified client entity.

In another system embodiment, one or both of the modified second ruleset and the retrieved historical transaction data are stored within a memory that is allocated to, accessible by, or controlled by the sandbox testing process flow.

The invention also provides a computer program product for updating configuration of a money laundering detection platform, comprising a non-transitory computer usable medium having a computer readable program code embodied therein. The computer readable program code comprising instructions for implementing at a processor implemented money laundering detection server, the steps of (i) receiving a request for a modification of a first ruleset for electronic transaction related money laundering event detection, (ii) identifying a client entity with which the received rule modification request is associated, (iii) initiating a sandbox testing process flow for testing the requested modification of the ruleset, (iv) associating the sandbox testing process flow with the identified client entity, (v) generating a modified second ruleset for electronic transaction related money laundering event detection, based on modification information received within or along with the received request for modification of the first ruleset, (vi) retrieving historical transaction data associated with the identified client entity, (vii) implementing through the sandbox testing process flow, money laundering event analysis based on application of the modified second ruleset to the retrieved historical transaction data for generating a money laundering event determination decision indicative of whether the historical transaction data is an outcome of money laundering related activity, and (viii) transmitting results of the money laundering event analysis implemented through the sandbox testing process flow to the client entity.

DESCRIPTION OF THE INVENTION

The invention provides methods, systems and computer program products for sandbox enabled testing of money laundering detection rules or rulesets, and for updating or modifying one or more rule configurations of a money laundering detection server or a money laundering detection platform based on the results of the sandbox enabled testing.

Figure 1A:
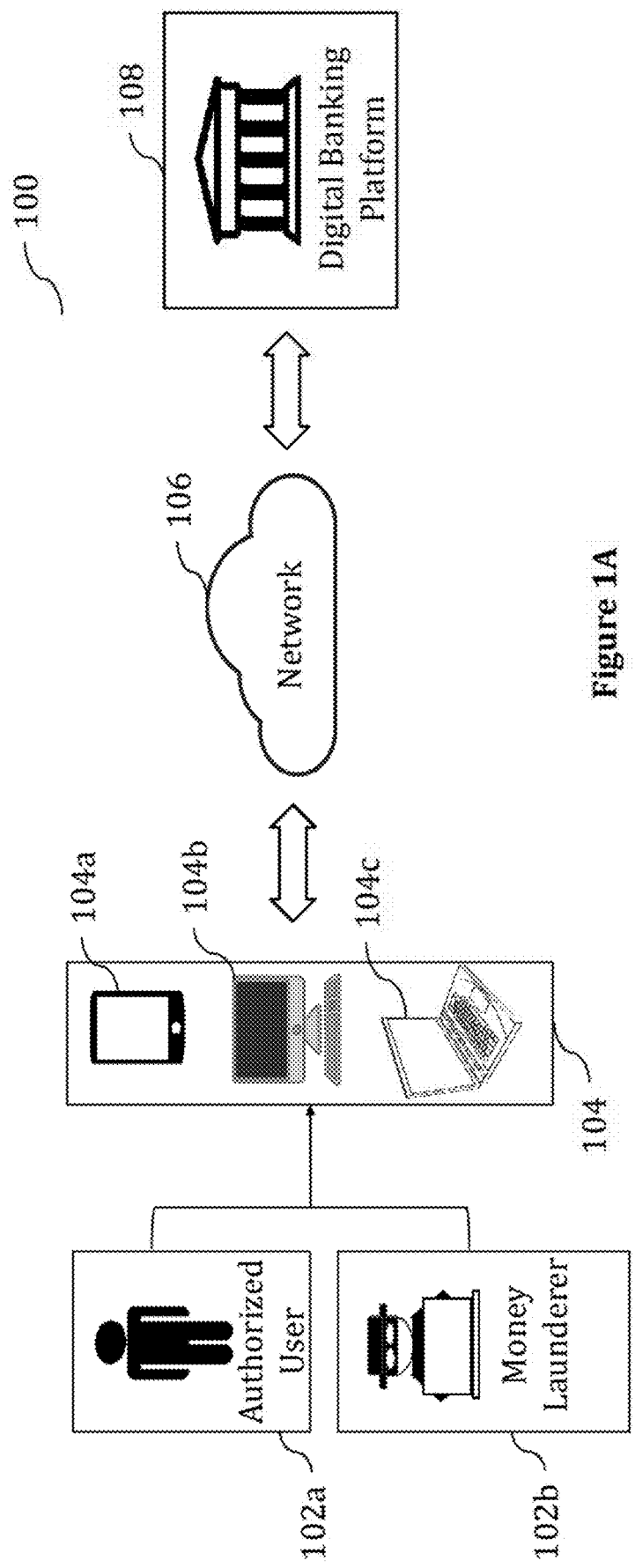
FIG. 1A illustrates a system environment within which both of legitimate electronic payment transactions and money laundering related electronic payment transactions are implementable through a digital banking platform.

FIG. 1A illustrates a system environment 100 within which both of legitimate electronic payment transactions and money laundering related electronic payment transactions are implementable through a digital banking platform 108.

As illustrated, system environment 100 consists of one or more client terminals 104, network 106 and a digital banking platform 108.

Client terminal 104 may include any terminal device having data processing and network communication capabilities. In a particular embodiment, client terminal 104 may include any of a mobile communication device 104a, desktop computer 104b, laptop computer 104c, or other computing device.

Client terminal 104 may be configured for network based data communication, and in an embodiment, may be directly or indirectly in network communication with money laundering detection platform 108 through network 106.

Network 106 may include any data network configured to enable data communication between remote entities. In an embodiment, network 106 includes any of a local area network, wide area network, internet work (such as the Internet), or any other network including a connected plurality of intercommunicating data processing devices or entities.

In an embodiment, digital banking platform 108 comprises a platform server 108a, a platform database 108b and a platform gateway interface 108c. For the purposes of this embodiment, platform server 108a may include at least one processor, and one or more transitory and/or non-transitory memories. Platform server 108a may be configured (i) to maintain payment accounts held with or maintained by digital banking platform 108, (ii) to enable electronic access to payment accounts held with digital banking platform 108, and/or (iii) to enable electronic payment transactions involving payment accounts held with digital banking platform 108. In an embodiment, platform database 108b may include a nontransitory memory based database, configured to store data records corresponding to users and electronic payments accounts that are maintained at digital banking platform 108. Platform gateway interface 108c may include a hardware or software network gateway configured to enable transmission and receipt of communications by digital banking platform 108.

As shown in FIG. 1A, both authorized user(s) 102a and money launderer(s) 102b may access digital banking platform 108 through client terminal 104 for initiating one or more electronic payment transactions into or out of one or more payment accounts maintained with digital banking platform 108. Digital banking platform 108 accordingly requires solutions for monitoring payment transactions and/or requests for payment transactions—for determining whether such payment transactions are legitimate or illicit.

Figure 2:
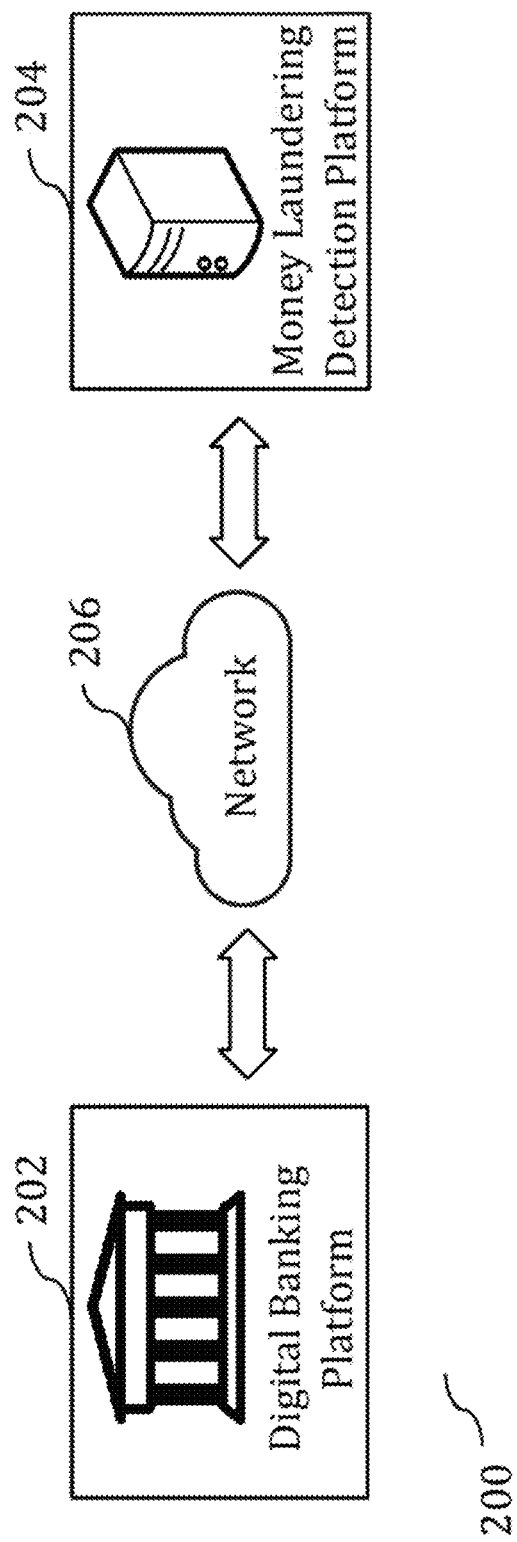
FIG. 2 illustrates a system environment within which a digital banking platform communicates with a money laundering detection platform for monitoring of electronic payment transactions.

FIG. 2 illustrates a system environment 200, within which a digital banking platform 202 communicates with a money laundering detection platform 204 through network 206 for monitoring of electronic payment transactions that are being implemented through the digital banking platform 202 for detecting and preventing money laundering.

Figure 1B:
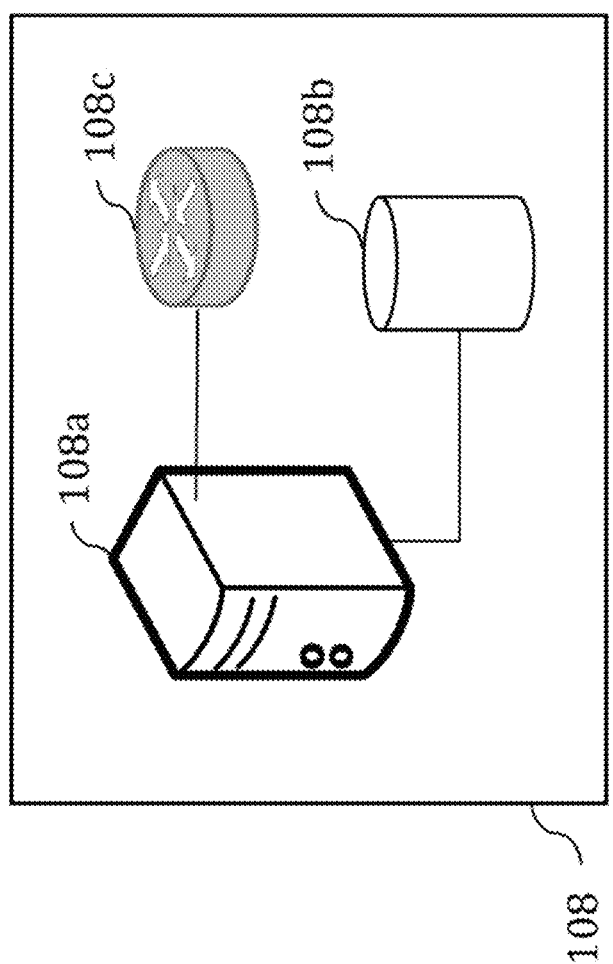
FIG. 1B illustrates an embodiment of a digital banking platform of a type illustrated more generally in FIG. 1A.

As in the case of FIG. 1A, network 206 may include any data network configured to enable data communication between remote entities. In an embodiment, network 206 includes any of a local area network, wide area network, internetwork (such as the Internet), or any other network including a connected plurality of intercommunicating data processing devices or entities. Digital banking platform 202 may be configured according to the digital banking platform embodiment described above in connection FIGS. 1A and 1B.

Money laundering detection platform 204 may comprise a server based platform to which transaction data, corresponding to electronic payment transactions and/or requests for electronic payment transaction that are received at digital banking platform 202, may be forwarded. Money laundering detection platform 204 is configured to assess the transaction data based on one or more money laundering detection rules or money laundering detection rulesets. Based on the money laundering detection rules, money laundering detection platform 204 determines whether transaction data received from digital banking platform 202 relates to a legitimate transaction or a money laundering activity related transaction. In the event that the transaction data is found to relate to a money laundering transaction, money laundering detection platform 204 notifies digital banking platform 202, which may take preventive or remedial action.

Each alert generated by money laundering detection platform 204 relates to or is generated based on at least one incident. An incident is a pattern of suspicious behavior that was detected relating to a single subject, who is either an account holder or the conductor of a transaction involving digital banking platform 202. The alert's subjects are the combination of subjects of every incident within the alert. Stated differently, each incident always has a unique subject, but an alert might have multiple subjects if it has multiple incidents.

Each alert is generated by one rule. Similar to how alerts are a combination of incidents, a rule is a combination of one or more conditions that are responsible for generating incidents. Each rule defines a way in which incidents generated by its conditions are combined into alerts. Condition(s) may be understood as a definition or specification of suspicious behavior that needs to be detected. Money laundering detection platform 204 may be configured to store or have access to conditions that enable detection of different types of behaviors, each one having its own set of parameters that can be configured to customize the behavior detected. Once conditions have been used to identify incidents, the corresponding rule is responsible for combining these into alerts.

Combining of incidents into alerts may be achieved based on one or both of rollup strategy and rollup period—both of which are rule based configurable options.

Rollup Strategy: defines the logic used to combine incidents into alerts. This can be Rollup by Condition—where all incidents generated by the same condition are combined into the same alert.

Rollup by Entity—where all incidents that have the same subject, whether an account holder or conductor, are combined into the same alert. This logic also accounts for joint accounts, where if the subject account of a transaction is jointly owned by two people, and suspicious behavior is detected in that transaction, two separate incidents will be generated, one for each account holder, but those incidents will also be combined into a single alert.

Rollup by Condition and Entity—which is a combination of the above two, so that incidents are grouped by both condition and entity.

Rollup Period: defines both when an alert will be first shown to an analyst, and the period of time after the creation of the alert within which new incidents may be included in that alert.

If not set—an alert may be shown to the analyst as soon as it is generated (i.e. its first incident is detected). The period of time when new incidents can be added to the alert is determined by the configuration of the condition that generated that first incident: it's the same duration as the condition will look for transactions. For example, if the condition is one of the CTR ones, which look at daily transactions, the period will be 1 day; if its a structuring condition configured to look at a 14 day window, then it'll be 14 days. Also, every time that a new incident is rolled into the alert, this period is reset.

If set—an Alert is shown to the analyst only at the end of the set period, counting from the date of detection of the first incident in the alert.

There is no reset of the period when new incidents get added to the alert.

Based on the above, it would be understood that the rules or rulesets defined for the purposes of setting conditions, identifying incidents and/or generating alerts are critical to detection of suspicious activity or money laundering related activity by the money laundering detection platform.

Non-limiting examples of rules of the type that may be used to detect suspicious or money laundering related activity by a money laundering detection platform are provided in the table below.

Rule Name Rule
Activity Deviation
Rule #10
Alert for monthly dollar amount of Incoming Wire must be at least $250k and at least 10 standard deviations above the profile average of the last 12 months. Account opened less than 180 days previously will not generate an alert CTR Client #1 Alert if there are Cash, Currency Exchange incoming or outgoing transactions for a customer totaling over $10K
Dormant Account
Aggregate #39
Alert if accounts over a balance of $100 have been dormant for over 3 months and aggregated activity over $50K was performed within 1 day.
Direction: Incoming or Outgoing.
Dormant Account
Single #35
Alert if accounts over a balance of $100 have been dormant for over 6 months and any transaction over $3K was performed within 1 day.
Elder Abuse #32 Alert if client is over the age of 60 and aggregated Outgoing activity in 30 days is at least $0 and 6 standard deviations over profile average of the preceding 90 days.
Monthly Risky
International
Transfer #28
Alert for monthly aggregate amount of Wire to or from High Risk countries above $500K. Account Type: Other.
Direction: Incoming or Outgoing.
Risky International
Transfer #26
Alert for any single Wire to or from Medium risk countries above amount of $500 K within 1 day.
Account Type: Other.
Direction: Incoming or Outgoing.
Structuring #19 Alert for Incoming Cash. Currency Exchange structuring activity over a period of time. 2 days must be observed within a 10 day window, each qualifying day with a total daily amount between $7K and $10K
Transaction Type
with Cash #33
Alert for 2 or more Incoming Cash transactions between $3K and $10K happening before or after 1 or more Outgoing Monetary Instrument transactions between $3K and $10K. All transaction sums must happen within 1 day.
First transaction is International: No.
Second Transaction is International: No.
Velocity Aggregate
38
Alert for aggregate incoming or outgoing transactions within 1 day totaling to at least $60k, where the total outgoing amount is between 90% and 110% of the incoming amount, and the total count of transactions is at least 50. Accounts opened for less than [x] days will not alert.
Velocity Single #3 Alert if there are 1 instances in 30 days of a pair of incoming and outgoing transactions totaling to at least $ 1M, where the second transaction (chronologically) has an amount between 90% and 110% of the amount of the first transaction (chronologically). Accounts opened for less than [x] days will not alert.

Figure 3:
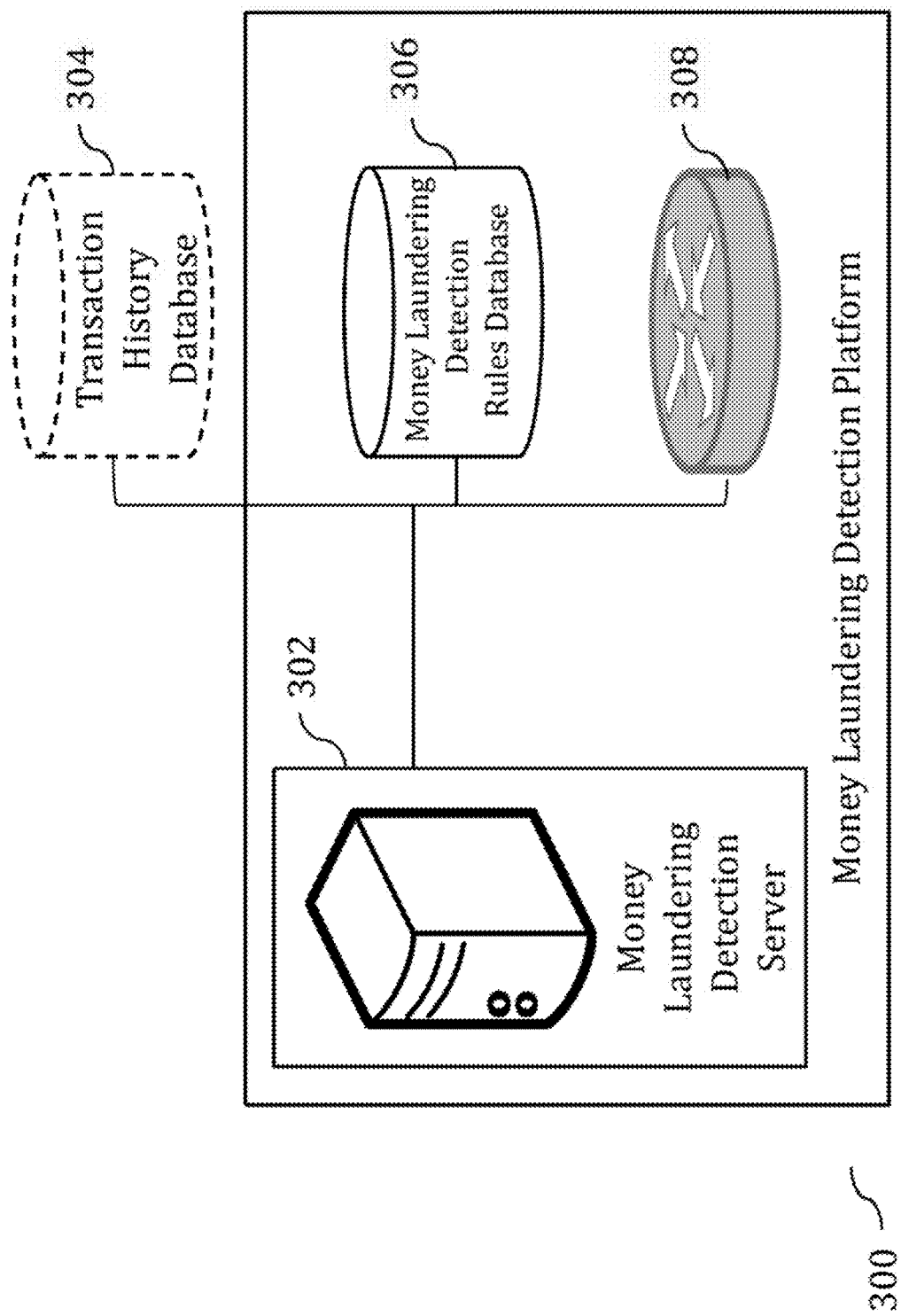
FIG. 3 illustrates an embodiment of a money laundering detection platform of the type more generally illustrated in FIG. 2.

FIG. 3 illustrates an embodiment of a money laundering detection platform 300, of the type more generally discussed in connection with FIG. 2.

As shown in FIG. 3, money laundering detection platform 300 may comprise a money laundering detection server 302, coupled with a transaction history database 304, money laundering detection rules database 306 and network interface 308.

Transaction history database 304 comprises a non-transitory memory database that is configured to retrievably store historical data corresponding to payment transactions and/or requests for payment transactions that have been received by of forwarded to a digital banking platform that is using the money laundering detection services of money laundering detection platform 300. The transaction data may include a plurality of data parameters corresponding to each recorded payment transaction/request for payment transaction, including one or more of payor identification data, payor account identification data, payee identification data, payee account identification data, digital banking platform identification data, transaction amount data, transaction timestamp data (or transaction request timestamp data), and network parameter data corresponding to one or more network communications associated with the recorded payment transaction/recorded request for payment transaction—which network parameter data may include location of the payor or payee (country, state, city). The transaction history database 304 may additionally store data identifying prior money laundering activity determinations or decisions taken by money laundering detection server 300 in connection with one or more past transactions or transaction requests.

In one embodiment, transaction history database 304 may comprise part of money laundering detection platform 300. In another embodiment, transaction history database 304 may comprise a part of a digital banking platform which utilizes the services of money laundering detection platform 300, and may be accessible by money laundering detection server 302.

Money laundering detection rules database 306 may comprise a non-transitory memory database configured to retrievably store one or more money laundering detection rules—based on which transaction data can be analyzed for determining whether data parameters corresponding to any transaction or transaction request received at a digital banking platform corresponds to suspicious or money laundering related transaction activity. One or more money laundering detection rules or rulesets stored within money laundering detection rules database 306 may comprise rules that are generally applicable across a plurality of (or all) digital banking platforms or are applicable to a plurality of client entities that use the services of money laundering detection platform 300. One or more money laundering detection rules or rulesets stored within money laundering detection rules database 306 may comprise rules that are specifically configured for and/or associated with a single digital banking platform or client entity, or with a specific sub-set of digital banking platforms or client entities that use the services of money laundering detection platform 300—wherein said rules or rulesets have been customized for money laundering detection on behalf of the specific digital banking platform(s) or client entity(ies).

Network interface 308 may include a hardware or software network gateway configured to enable transmission and receipt of communications by money laundering detection platform 300.

Money laundering detection server 302 comprises a processor based server configured to receive transaction data or transaction request data from one more digital banking platforms 202, and to analyze the received data based on one or more money laundering detection rules or money laundering detection rulesets retrieved from money laundering detection rules database 304. Based on the money laundering detection rules, money laundering detection server 302 determines whether transaction data or transaction request data received from a digital banking platform 202 relates to a legitimate transaction or a money laundering transaction. In the event the transaction data or transaction request data is found to relate to a money laundering related or suspicious transaction, money laundering detection server 204 initiates transmission of a notification or alert to the banking platform 202—which may take preventive or remedial action in connection with the detected money laundering transaction activity or suspicious transaction activity.

Figure 4:
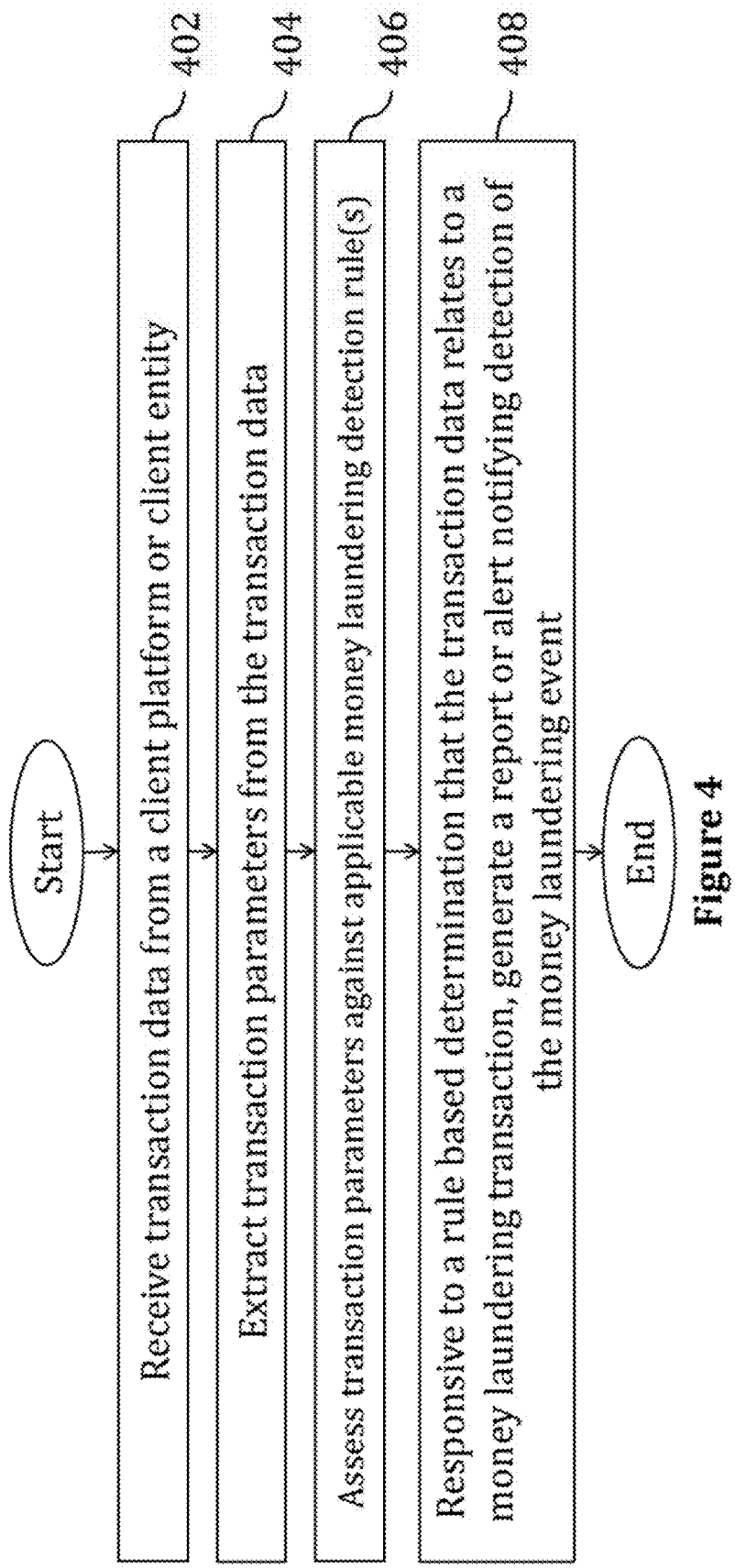
FIG. 4 illustrates a method of money laundering monitoring or money laundering detection as implemented within a money laundering detection platform.

FIG. 4 illustrates a method of money laundering monitoring or detection as implemented within a money laundering detection platform of a kind described in connection with FIGS. 2 and 3 above.

Step 402 comprises receiving transaction data from a client platform or client entity. The transaction data at step 402 may be received at money laundering detection platform 204, 300. The client platform may comprise any client terminal that is being operated by a client entity for using the services of money laundering detection platform 204, 300. In an embodiment, the client platform may comprise any data processing and network communication enabled client terminal device configured to transmit transaction data to money laundering detection platform 204, 300. The client platform may in a particular embodiment comprise a digital banking platform 202 that is communicably coupled with money laundering detection platform 204, 300.

For the purposes of FIG. 4, it would be understood that the received transaction data may comprise data corresponding to a requested electronic transaction or to an electronic transaction that is under implementation at a client entity, and that is forwarded to the money laundering detection platform 204, 300. The transaction data may include data representing a plurality of data parameters corresponding to one or more payment transactions or requests for payment transactions that are sought to be implemented at the client entity—including any one or more of payor identification data, payor account identification data, payee identification data, payee account identification data, digital banking platform identification data, transaction amount identification data, transaction timestamp data (or request timestamp data), and network parameter data corresponding to one or more network communications associated with the recorded payment transaction/recorded request for payment transaction—which network parameter data may include location of the payor or payee (country, state, city). The transaction history database 304 may additionally store data identifying prior money laundering activity determinations or decisions taken by money laundering detection server 300 in connection with one or more past transactions or transaction requests.

Step 404 comprises extracting from the received transaction data, one or more transaction parameters described within the transaction data. In an embodiment, the extracted transaction parameters may correspond to a requested electronic transaction or an electronic transaction that is under implementation at the forwarding client entity.

Step 406 comprises assessing or analyzing the transaction parameters against one or more applicable money laundering detection rules—for the purposes of identifying money laundering related activity or suspicious activity. The money laundering detection rules may comprise money laundering detection rules that are either generally applicable to all client entities or that are specifically applicable to the client entity from which the transaction data has been received at step 402.

At step 408, responsive to a rule based determination (at step 406) that the transaction data relates to a money laundering related transaction or suspicious transaction or activity, a report, notification or alert is generated, flagging detection of the money laundering related activity or suspicious activity. The report, notification or alert may in an embodiment be transmitted to the client entity or client platform for remedial or corrective action.

Figure 5:
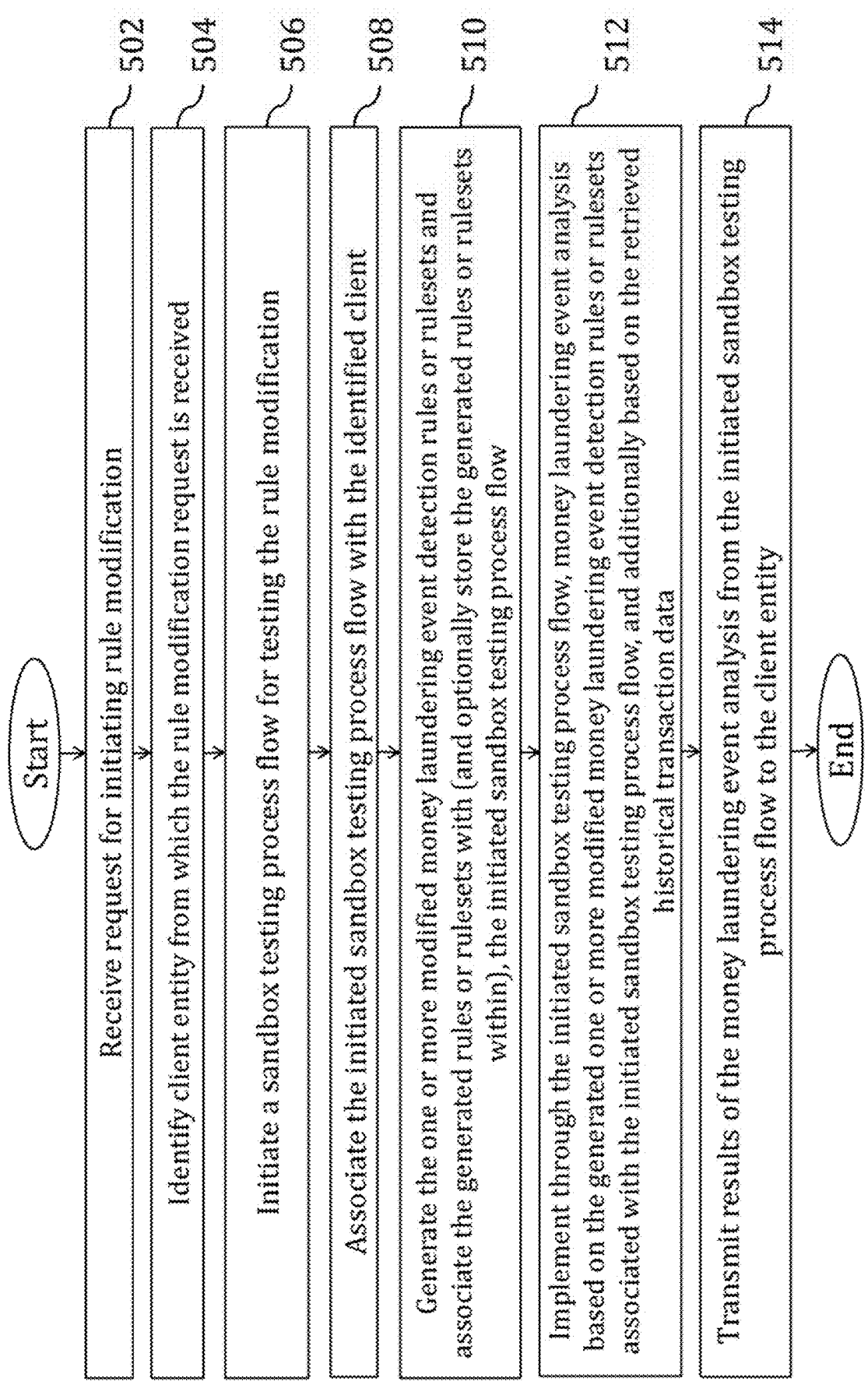
FIG. 5 illustrates a method of modifying one or more money laundering detection rules or rulesets corresponding to a money laundering detection platform, in accordance with the teachings of the present invention.

FIG. 5 illustrates a method of modifying one or more money laundering detection rules or rulesets corresponding to a money laundering detection platform, in accordance with the teachings of the present invention. The objective of the method of FIG. 5 is to enable convenient client entity/customer—end modification of money laundering detection rules or rulesets (without the active participation of system administrators or DevOps at the money laundering detection platform) in a manner that enables secure and convenient testing of the modified money laundering detection rules or rulesets, and which ensures that such modifications do not result in unintended outcomes or errors. In an embodiment, the method of FIG. 5 may be implemented at a money laundering detection platform of a kind described above in connection with FIGS. 2 and 3. In a more particular embodiment, the money laundering detection platform may be configured to provide network based or cloud based money laundering detection services to a plurality of client entities.

Step 502 comprises receiving a request for initiation of a rule modification to a ruleset (comprising one or more rules) for electronic transaction relate money laundering event detection that is applicable to a client entity. The rule modification request may comprise a request for any of addition of a new rule, deletion of a prior existing rule that is associated with a client entity, or amendment of a prior existing rule associated with the client entity. The request may be received from a client entity that is authorized for using the services of the money laundering detection platform—for example, from a client terminal or server through which the requesting client entity is authorized to communicate with the money laundering detection platform. In an embodiment, the request for rule modification relates to one or more rules or rulesets that are exclusively applicable to the requesting client entity. In another embodiment, the request for rule modification may relate to modification of one, or more than one, or all of the conditions within a rule. The request may include information defining any of (i) a rule to be added, (ii) a rule to be amended or altered and the amendment that requires to be made, or (iii) a rule to be deleted from a prior existing ruleset.

Step 504 comprises identifying a client entity from which the rule modification request has been received. The client entity may be identified based on any of multiple identification parameters, including without limitation a received client entity identifier, a network address of a client terminal from which the request for rule modification or updating has been received, and/or a device identifier associated with a client device from which the request for rule modification or updating has been received.

Step 506 comprises initiating a sandbox testing process flow for testing the rule modification that is under implementation. For the purposes of the present invention, it would be understood that the term "sandbox" or "sandbox testing" shall be used to refer to software testing within an environment or data structure that enables isolated execution of one or more money laundering detection rules for evaluation, monitoring or testing (e.g. the one or more money laundering detection rules or rulesets that are being added or modified as part of the rule modification process, or a ruleset from which one or more money laundering detection rules have been deleted as part of the rule modification process). In an embodiment, the environment or data structure for isolated execution may comprise a physical or logical area of a processor's (for example a money laundering detection server's) memory and/or runtime environment or one or more temporary data structures, data records or database tables, that are generated and configured to enable implementation of a sandbox (test) version of a money laundering detection engine to analyze (for example, through money laundering event detection analysis of) transaction data (and in a particular embodiment, historical transaction data) based on the one more modified rules or ruleset(s) so as to enable a client entity to test and ascertain the outcomes of the modified rules or ruleset(s) prior to implementing the modified rules or ruleset(s) on live or real time transaction data for the client entity.

In an embodiment, initiating the sandbox testing process flow at step 506 may comprise allocating a physical or logical area of memory and/or runtime environment that is controlled by a money laundering detection server, or generating or one or more temporary data structures, data records or database tables, that are generated and configured to enable implementation of a sandbox (test) version, for the purposes of implementing the initiated sandbox testing process flow.

Step 508 comprises associating the initiated sandbox testing process flow and/or the generated one or more temporary data structures, data records or database tables, with the client entity identified at step 504. In a particular embodiment, associating the initiated sandbox testing process flow and/or the generated one or more temporary data structures, data records or database tables, with the client entity may include associating a client identifier corresponding to the client entity with the initiated sandbox testing process flow and/or the generated one or more temporary data structures, data records or database tables. In various embodiments, step 508 may additionally include one or more of (i) retrieving path information for a data repository that stores historical transaction data associated with the associated client entity, (ii) establishing a physical or logical network data channel for retrieving historical transaction data of the associated client entity from a data repository that stores such historical transaction data, and (iii) establishing a physical or logical network channel for transmitting the results of testing a rule modification(s) within the sandbox, to the associated client.

Step 510 comprises generating one or more modified money laundering event detection rules or ruleset(s) based on the information received at step 502. In an embodiment where the information received at step 502 defines a rule to be added, a new money laundering detection rule may be generated based on this information. In an embodiment where the information received at step 502 defines a rule to be amended, an amended rule may be generated by incorporating an identified amendment into a rule that has been identified for amendment. In another embodiment, where the information received at step 502 defines a rule to be deleted from an existing rule set, a modified rule set may be generated by copying all rules except for the rule that has been identified for deletion into a modified ruleset. The generated one or more modified money laundering event detection rules or ruleset(s) is thereafter associated with the initiated sandbox testing process flow and/or the generated one or more temporary data structures, data records or database tables—and optionally may be stored within a memory allocated to the initiated sandbox testing process flow and/or the generated one or more temporary data structures, data records or database tables.

Step 512 comprises implementing through the initiated sandbox testing process flow, money laundering event analysis based on the one or more modified money laundering event detection rules or rulesets that have been generated at step 510 and are associated with the initiated sandbox testing process flow, and based on historical transaction data that is associated with the client entity identified at step 504. The historical transaction data associated with the client entity may be retrieved from a transaction history database. In an embodiment, the historical transaction data that is associated with the client entity may be retrieved from the transaction history database, based on a client identifier associated with the client entity.

The retrieval of historical transaction data associated with the client entity may also depend on one or more historical transaction data filtering parameters associated with initiated sandbox testing process flow and/or the generated one or more temporary data structures, data records or database tables. For example, in the event the initiated sandbox testing process flow is configured for retrieval of historical transaction data for the last 30 days for the purposes of money laundering event analysis, retrieval of historical transaction data from the transaction history database will be restricted to historical transaction data accumulated in connection with the client entity over the last 30 days.

The historical transaction data may in an embodiment be retrieved and stored in a memory associated with or accessible by the initiated sandbox testing process flow. In an alternate embodiment, the historical transaction data may be accessed by the initiated sandbox testing process flows through one or database queries that are generated based on the filters of the money laundering event detection rules or rulesets that are under modification.

The money laundering event analysis at step 512 comprises applying the one or more modified money laundering event detection rules or rulesets (that have been generated at step 510 and that have been associated with the sandbox testing process flow) to the retrieved historical transaction data—to ascertain whether the historical transaction data triggers an alert or notification of money laundering related activity or suspicious activity based on the modified money laundering event detection rules or rulesets. The analysis may in an embodiment result in a money laundering event determination decision identifying whether a transaction event represented by retrieved historical transaction data is a legitimate event (or has a specified or predefined likelihood of being a legitimate event) or whether the transaction event corresponding to retrieved historical transaction data is a money laundering related event or suspicious event (or has a specified or predefined likelihood of being a money laundering related event or suspicious event).

Step 514 comprises transmission of the results of the money laundering event analysis at step 512, to the client entity—so that the client entity can review or validate the outcomes of the testing of the modified money laundering event detection rules or rulesets. In an embodiment, the results of the money laundering event analysis at step 512 is in the form of a report that incorporate alerts and/or incidents indicating money laundering activity, which may be displayed, communicated or transmitted to a user. In an alternate embodiment, results of the money laundering event analysis at step 512 may be transmitted by way of one or more reports, alerts or incident notifications to a terminal or address associated with the client entity. The client entity may use these results to determine (for example, through a regression type analysis) whether the modifications to the money laundering event detection rules or ruleset(s) are acceptable and likely to provide desired functional outcomes, prior to applying the modified money laundering event detection rules or ruleset(s) to live data or real-time data.

Figure 6:
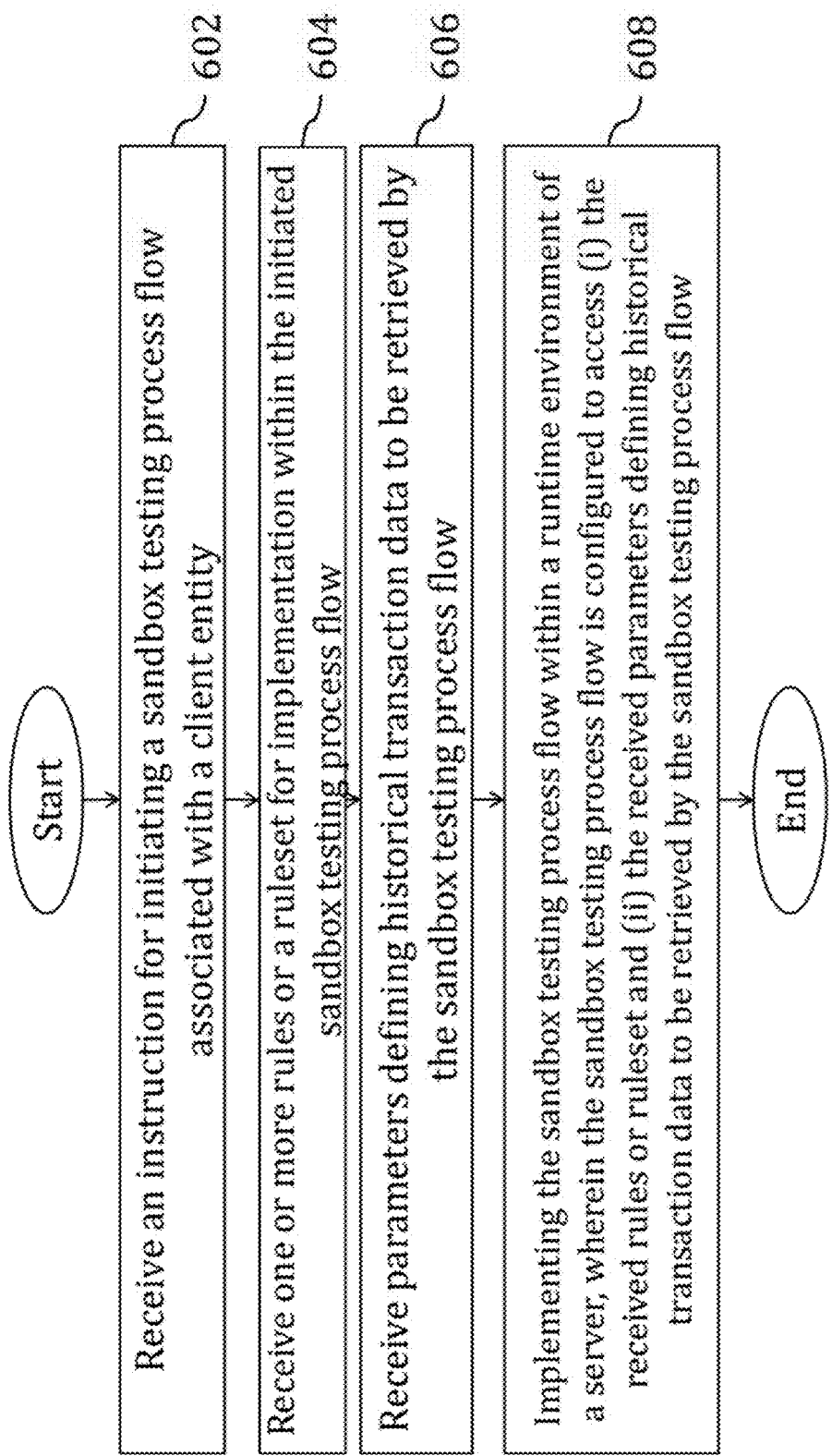
FIG. 6 illustrates a method of initiating a sandbox testing process flow within a server runtime environment and for configuring the sandbox testing process flow with money laundering detection rules for implementing the method more generally discussed in connection with FIG. 5.

FIG. 6 illustrates a method of initiating a sandbox testing process flow within a server runtime environment and for providing the sandbox testing process flow with money laundering detection rules for implementing the method more generally discussed in connection with FIG. 5. In an embodiment, the method of FIG. 6 may be implemented at a money laundering detection platform of a type described above in connection with FIGS. 2 and 3.

Step 602 comprises receiving an instruction for initiating a sandbox testing process flow associated with a client entity.

Step 604 comprises receiving one or more money laundering event detection rules or a money laundering event detection ruleset that are/is intended to be implemented for the purposes of money laundering detection analysis of historical transaction data, through the sandbox testing process flow. In an embodiment, at least one of the received one or more rules or at least one rule within the received ruleset is a modified money laundering event detection rule that has been generated in accordance with step 510 of FIG. 5. The one or more money laundering event detection rules or money laundering event detection ruleset may be stored in a memory allocated to the sandbox testing process flow or in a memory that is accessible by or controlled by the sandbox testing process flow.

Step 606 comprises receiving one or more parameters defining historical transaction data that is to be retrieved during the sandbox testing process flow from a historical transaction database—for the purposes of testing of modified money laundering event detection rules through the sandbox testing process flow. The one or more parameters may in an embodiment be received through user or operator inputs—and in a specific embodiment, may be received through inputs from a user or operator associated with the client entity. In an embodiment, the one or parameters may identify any one or more of (i) a client entity to whom the retrieved historical transaction data must correspond, (ii) the type or attributes of historical transactions for which historical data may be received—e.g. minimum transaction value, maximum transaction value, payor identity, payee identity, payor account type, payee account type etc., and (iii) time parameters defining a time window corresponding to which historical transaction data requires to be received.

The one or more parameters received at step 606 may be stored in a memory associated with the sandbox testing process flow or in a memory that is accessible by or controlled by the sandbox testing process flow. This memory may in an embodiment comprise transitory memory or volatile memory such as random access memory (RAM).

Step 608 comprises initiating the sandbox testing process flow within a runtime environment of a server (for example, within a runtime environment of a money laundering detection server within a money laundering detection platform), wherein the sandbox testing process flow is configured to access (i) the rules or ruleset received at step 604, and (ii) the received parameters defining historical transaction data for retrieval, that have been received at step 606. The sandbox testing process flow may be configured to retrieve historical transaction data from a historical transaction database, based on the parameters received at step 606. The sandbox testing process flow may further be configured to implement money laundering event detection analysis by applying the rules or ruleset received at step 604 to historical transaction data that has been retrieved from a historical transaction database based on the parameters received at step 606.

Figure 7:
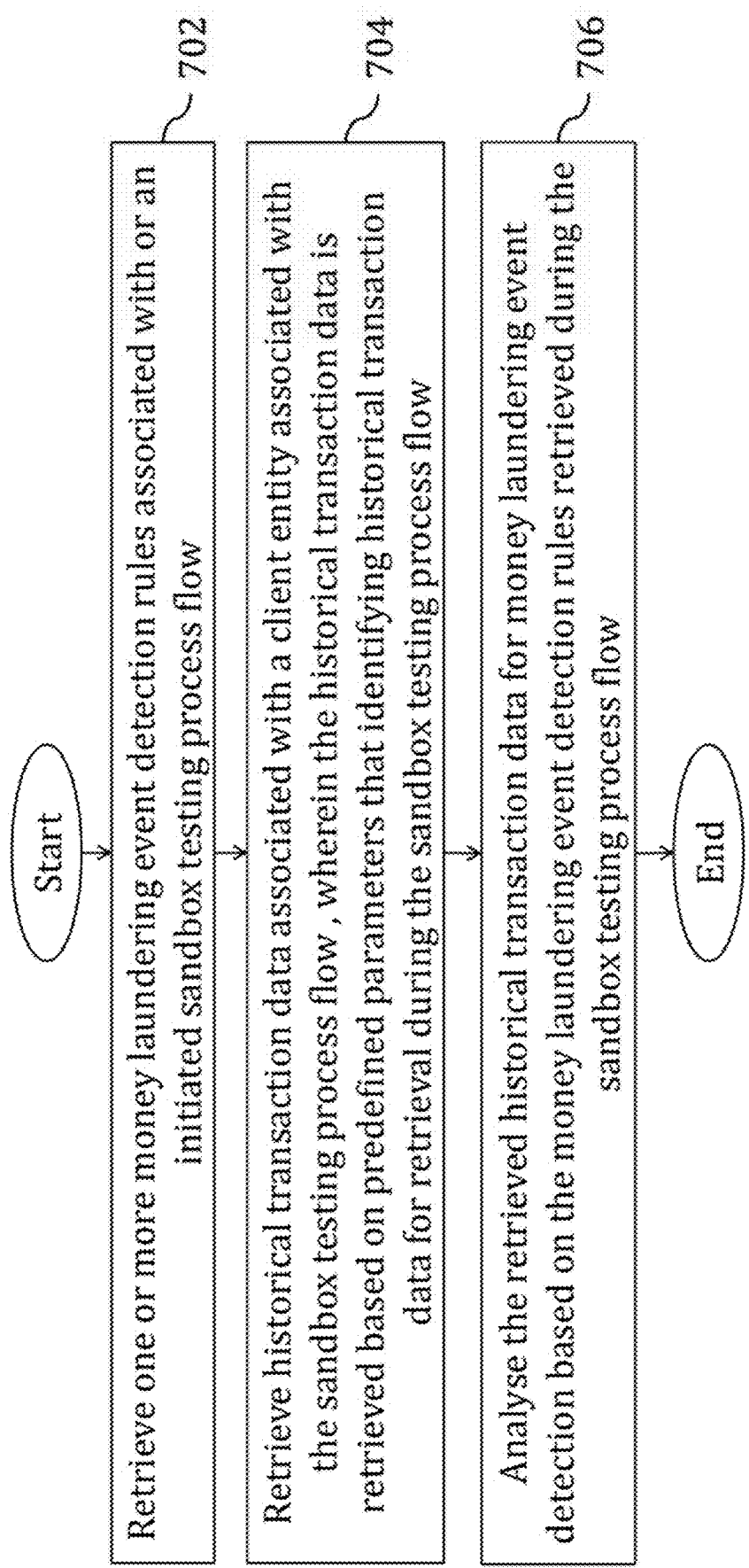
FIG. 7 illustrates a method of testing one or more modified rules or rulesets through a sandbox testing process flow that has been initiated in accordance with the method of FIG. 6.

FIG. 7 illustrates a method of testing of one or more modified rules or rulesets through a sandbox testing process flow that has been configured in accordance with the method of FIG. 6. In an embodiment, the method of FIG. 7 may be implemented at a money laundering detection platform of a kind described above in connection with FIGS. 2 and 3.

Step 702 comprises retrieving one or more money laundering event detection rules associated with or stored within the sandbox testing process flow. At least one of the retrieved one or more money laundering event detection rules is a modified money laundering event detection rule that has been generated in accordance with step 510 of the method of FIG. 5.

Step 704 comprises retrieving historical transaction data of a client entity associated with the sandbox testing process flow, wherein the historical transaction data is retrieved based on predefined parameters that specify historical transaction data for retrieval within the sandbox testing process flow. It would be understood that the predefined parameters may comprise one or more historical transaction data filtering parameters associated with the sandbox testing process flow. In an embodiment, the predefined parameters may comprise one or more parameters received at step 606 of the method of FIG. 6—which define historical transaction data that is to be retrieved by the sandbox testing process flow from a historical transaction database—for the purposes of testing of modified money laundering event detection rules by the sandbox testing process flow.

Step 706 comprises analyzing the retrieved historical transaction data for money laundering event detection based on the retrieved money laundering event detection rules associated with the sandbox testing process flow. The money laundering event analysis at step 706 comprises applying the one or money laundering event detection rules or rulesets (that have been retrieved at step 702 and that are associated with the sandbox testing process flow) to the historical transaction data retrieved at step 704—to ascertain whether the historical transaction data triggers an alert or an incident indicating money laundering related activity or suspicious activity based on the retrieved money laundering event detection rules or ruleset(s). In an embodiment, the analysis may result in a money laundering event determination decision that identifies whether a transaction event represented by the retrieved historical transaction data, is a legitimate transaction event (or has a specified or predefined likelihood of being a legitimate transaction event) or whether the transaction event corresponding to the retrieved historical transaction data is a money laundering related event or suspicious event (or has a specified or predefined likelihood of being a money laundering related event or suspicious event).

It would be understood that depending on the results of the sandbox testing process flow executed in accordance with the method of FIG. 7, a user/operator may arrive at an informed decision on whether proposed modifications to money laundering detection rules or money laundering detection rulesets are correct and would result in predictable and desirable outcomes—and therefore whether to apply such modifications to the money laundering detection rules or money laundering detection rulesets during actual operations of a money laundering detection system.

Figure 8:
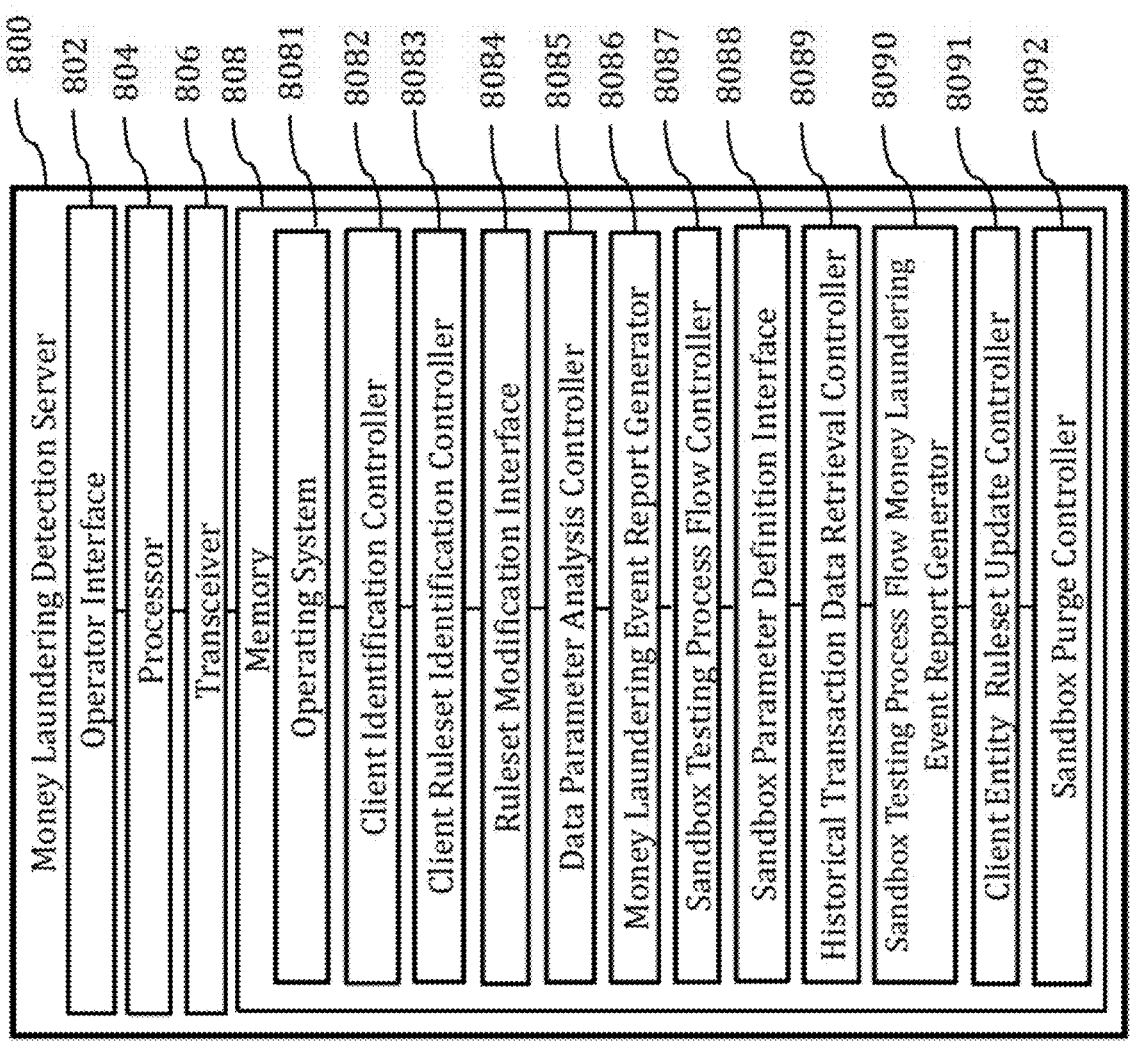
FIG. 8 illustrates an exemplary embodiment of a money laundering detection server of a type that is implementable within a money laundering detection platform in accordance with the present invention.

FIG. 8 illustrates an exemplary embodiment of a money laundering detection server 800 of a type that is implementable within a money laundering detection platform. It would be understood that money laundering detection server 800 is a server of a type that may be implemented within money laundering detection platform 204, 300—and may comprise a server of a type more generally illustrated as money laundering detection server 802.

In specific embodiments, money laundering detection server 800 may include an operator interface 802, processor 804, communication transceiver 806 and memory 808, which memory 808 may include transitory memory and/or non-transitory memory. In an exemplary embodiment, memory 808 may have stored therewithin, (i) an operating system 8081 configured for managing device hardware and software resources and that provides common services for software programs implemented within money laundering detection server 800, (ii) a processor implemented client identification controller 8082 configured to implement one or more of the client identification steps disclosed in any of FIGS. 5 to 7 described above, (iii) a processor implemented client ruleset identification controller 8083 configured to identify one or more money laundering event detection rules or rulesets that are associated with a client entity, (iv) a processor implemented ruleset modification interface 8084 comprising an interface through which a user, operator or client entity may provide instructions and inputs to money laundering detection server 800 for the purposes of implementing a money laundering event detection rule modification process workflow, (v) a processor implemented data parameter analysis controller 8085 configured to analyze transaction data based on one or more money laundering event detection rules to ascertain whether the transaction data is indicative of, or provides evidence of, money laundering related transaction activity or suspicious transaction activity—including by way of method steps 512 and/or 706, (vi) a processor implemented money laundering event report generator 8086 configured to generate and initiate transmission of a money laundering event report that comprises the results of analysis of transaction data based on one or more money laundering event detection rules, (vii) a processor implemented sandbox instantiation controller 8087 configured to initiate a sandbox testing process flow—for example, by implementing any of step 506 or steps 602 to 608 described above, (viii) a processor implemented sandbox parameter definition interface 8088 configured to enable a user, operator or client entity to input parameters for rule configuration of a sandbox testing process flow—including parameters that define historical transaction data that is retrieved and analyzed by the sandbox testing process flow (for example at step 606) for analysis based on modified money laundering event detection rules or ruleset(s), (ix) a processor implemented historical transaction data retrieval controller 8089 configured for retrieving historical transaction data associated with a client entity from a historical transaction database—for example, by implementing steps 512, 608, and/or 704, (x) a processor executed sandbox testing process flow money laundering event report generator 8090 configured to generate and initiate transmission of a money laundering event report comprising the results of analysis of historical transaction data based on one or more modified money laundering event detection rules that are under test through a sandbox testing process flow—for example, by implementing step 514, (xi) a processor implemented client entity ruleset update controller 8091 configured to update a non-transitory memory based money laundering event detection rules database that is associated with a client entity, with one or more money laundering event detection rules associated with a sandbox testing process flow, and (xii) a processor implemented sandbox purge controller 8092 configured for deleting or purging data associated with a sandbox testing process flow from the runtime environment of a money laundering detection server.

Figure 9:
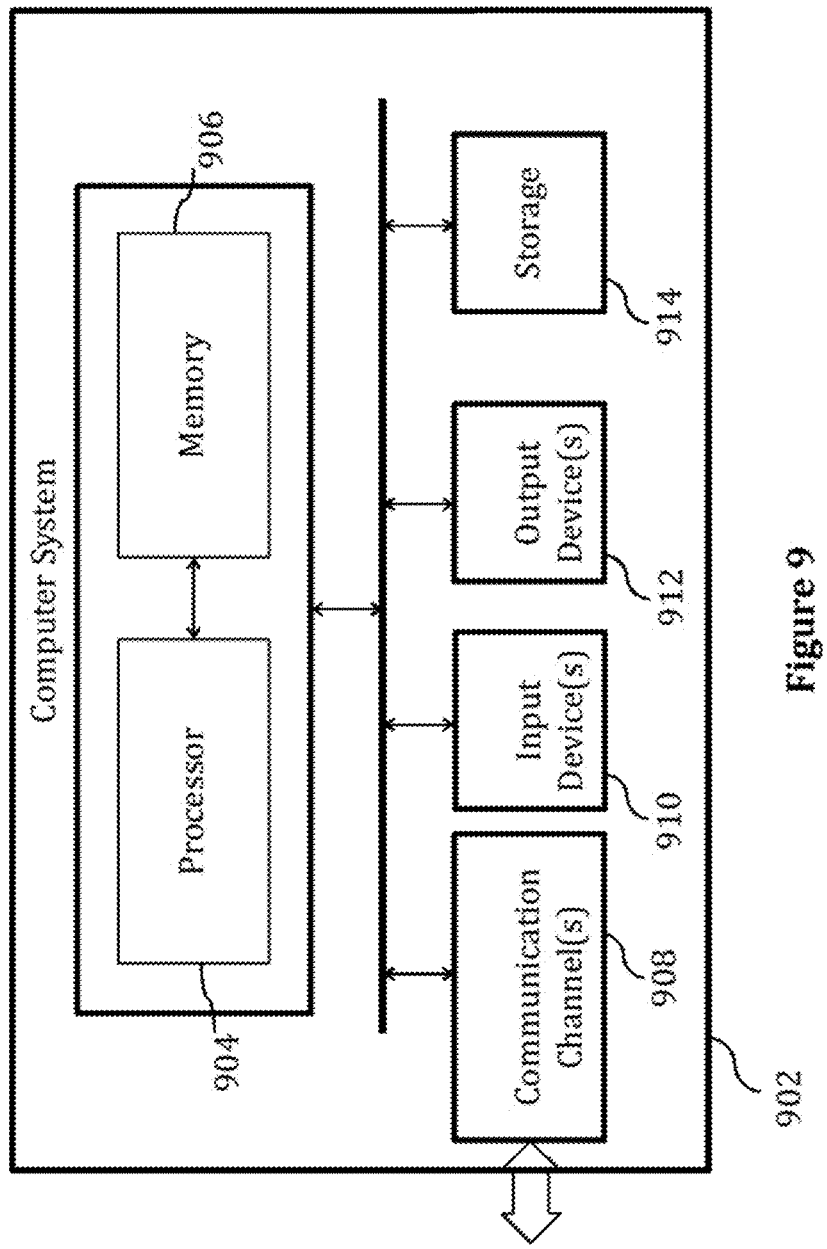
FIG. 9 illustrates an exemplary computer system according to which various embodiments of the present invention may be implemented.

FIG. 9 illustrates an exemplary computer system according to which various embodiments of the present invention may be implemented.

System 900 includes computer system 902 which in turn comprises one or more processors 904 and at least one memory 906. Processor 904 is configured to execute program instructions—and may be a real processor or a virtual processor. It will be understood that computer system 902 does not suggest any limitation as to scope of use or functionality of described embodiments. The computer system 902 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 902 in accordance with the present invention may include one or more servers, desktops, laptops, tablets, smart phones, mobile phones, mobile communication devices, tablets, phablets and personal digital assistants. In an embodiment of the present invention, the memory 906 may store software for implementing various embodiments of the present invention. The computer system 902 may have additional components. For example, the computer system 902 may include one or more communication channels 908, one or more input devices 910, one or more output devices 912, and storage 914. An interconnection mechanism (not shown) such as a bus, controller, or network, interconnects the components of the computer system 902. In various embodiments of the present invention, operating system software (not shown) provides an operating environment for various softwares executing in the computer system 902 using a processor 904, and manages different functionalities of the components of the computer system 902.

The communication channel(s) 908 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave. Bluetooth or other transmission media.

The input device(s) 910 may include, but is not limited to, a touch screen, a keyboard, mouse, pen, joystick, trackball, a voice device, a scanning device, or any another device that is capable of providing input to the computer system 902. In an embodiment of the present invention, the input device(s) 910 may be a sound card or similar device that accepts audio input in analog or digital form. The output device(s) 912 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 902.

The storage 914 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 902. In various embodiments of the present invention, the storage 914 may contain program instructions for implementing any of the described embodiments.

In an embodiment of the present invention, the computer system 902 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 902. The method described herein is typically implemented as a computer program product, comprising a set of program instructions that is executed by the computer system 902 or any other similar device. The set of program instructions may be a series of computer readable codes stored on a tangible medium, such as a computer readable storage medium (storage 914), for example, diskette, CD-ROM, ROM, flash drives or hard disk, or transmittable to the computer system 902, via a modem or other interface device, over either a tangible medium, including but not limited to optical or analogue communications channel(s) 908. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers significant advantages—in particular, by enabling convenient client/customer—end modification of money laundering detection rules or rulesets (without requiring the active participation of system administrators or devops at the money laundering detection platform), and additionally by ensuring prior isolated testing of the modified money laundering detection rules or rulesets to ensure that such modifications do not result in unintended outcomes or errors.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

What is claimed is:

1. A computerized-method for initiating a sandbox testing process flow associated with a client entity, within a server runtime environment and configuring said sandbox testing process flow with money laundering detection rules, said computerized-method comprising the steps of:
   (i) receiving:
      a. an instruction for initiating a sandbox testing process flow associated with a client entity;
      b. one or more money laundering detection rules for implementation within the sandbox testing process flow;
      c. parameters defining historical transaction data to be retrieved by the sandbox testing process flow;
   (ii) monitoring the one or more money laundering detection rules by implementing through the sandbox testing process flow, money laundering event analysis based on an application of the one or more rules on retrieved historical transaction data by the received parameters thereof for generating a money laundering event detennination decision indicative of whether the retrieved historical transaction data is an outcome of money laundering related activity; and
   (iii) transmitting results of the money laundering event analysis implemented through the sandbox testing process flow to the client entity to check that the one or more money laundering detection rules are error free and do not result in any unintended outcomes or errors, wherein the initiation of the sandbox testing process flow is in a software testing for testing the money laundering detection one or more rules of the client entity.

2. The computerized-method of claim 1, wherein the software testing is within an environment or data structure that enables an isolated execution of one or more money laundering detection rules for evaluation, monitoring or testing.

3. The method as claimed in claim 1, wherein a runtime environment for implementing the sandbox testing process flow includes a physical or logical area of the money laundering detection server memory or runtime environment that is configured to implement money laundering event detection analysis of historical transaction data corresponding to the client entity, based on the one or more money laundering detection rules.

4. The method as claimed in claim 1, wherein the retrieval of historical transaction data associated with the client entity is based on one or more historical transaction data filtering parameters that have been received for initiating the sandbox testing process flow.

5. The method as claimed in claim 4, wherein the one or more historical transaction data filtering parameters are received through operator inputs from an operator or a client device associated with the client entity.

6. A computerized-system for initiating a sandbox testing process flow associated with a client entity, within a server runtime environment and configuring said sandbox testing process flow with money laundering detection rules, said computerized-system comprising a money laundering detection server that includes:
at least one memory; and
a processor configured for:
   (i) receiving:
      a. an instruction for initiating a sandbox testing process flow associated with a client entity;
      b. one or more money laundering detection rules for implementation within the sandbox testing process flow;
      c. parameters defining historical transaction data to he retrieved by the sandbox testing process flow
   (ii) monitoring the one or more money laundering detection rules by implementing through the sandbox testing process flow, money laundering event analysis based on an application of the one or more rules on retrieved historical transaction data by the received parameters thereof for generating a money laundering event determination decision indicative of whether the retrieved historical transaction data is an outcome of money laundering related activity; and (iii) transmitting results of the money laundering event analysis implemented through the sandbox testing process flow to the client entity to check that the one or more money laundering detection rules are error free and do not result in any unintended outcomes or errors, wherein the initiation of the sandbox testing process flow is in a software testing for testing the money laundering detection one or more rules of the client entity.

7. The computerized system of claim 6, wherein the software testing is within an environment or data structure that enables an isolated execution of one or more money laundering detection rules for evaluation, monitoring or testing.

8. The computerized-system as claimed in claim 6, wherein a runtime environment for implementing the sandbox testing process flow includes a physical or logical area of the money laundering detection server memory or runtime environment that is configured to implement money laundering event detection analysis of historical transaction data corresponding to the client entity, based on the one or more money laundering detection rules.

9. The method as claimed in claim 6, wherein the retrieval of historical transaction data associated with the client entity is based on one or more historical transaction data filtering parameters that have been received for initiating the sandbox testing process flow.

10. The method as claimed in claim 9, wherein the one or more historical transaction data filtering parameters are received through operator inputs from an operator or a client device associated with the client entity.

11. A computer program product for initiating a sandbox testing process flow associated with a client entity, within a server runtime environment and configuring said sandbox testing process flow with money laundering detection rules, said computer program product comprising the steps of
  (i) receiving:
     a. an instruction for initiating a sandbox testing process flow associated with a client entity;
     b. one or more money laundering detection mules for implementation within the sandbox testing process flow;
     c. parameters defining historical transaction data to be retrieved by the sandbox testing process flow:
  (ii) monitoring the one or more money laundering detection rules by implementing through the sandbox testing process flow, money laundering event analysis based on an application of the one or more rules on retrieved historical transaction data by the received parameters thereof for generating a money laundering event determination decision indicative of whether the retrieved historical transaction data is an outcome of money laundering related activity; and
  (iii) transmitting results of the money laundering event analysis implemented through the sandbox testing process flow to the client entity to check that the one or more money laundering detection rules are error free and do not result in any unintended outcomes or errors, wherein the initiation of the sandbox testing process flow is in a software testing for testing the money laundering detection one or more rules of the client entity.

\* \* \* \* \*